(12) United States Patent
Hornbostel et al.

(10) Patent No.: US 12,447,567 B2
(45) Date of Patent: Oct. 21, 2025

(54) PROCESS ARRANGEMENT FOR CARRYING OUT A FULLY AUTOMATIC SETTING PROCESS

(71) Applicant: AUDI AG, Ingolstadt (DE)

(72) Inventors: Norbert Hornbostel, Talheim (DE); Frank Wrede, Oedheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/551,625

(22) PCT Filed: May 11, 2022

(86) PCT No.: PCT/EP2022/062715
§ 371 (c)(1),
(2) Date: Sep. 21, 2023

(87) PCT Pub. No.: WO2022/263062
PCT Pub. Date: Dec. 22, 2022

(65) Prior Publication Data
US 2024/0173806 A1    May 30, 2024

(30) Foreign Application Priority Data
Jun. 15, 2021 (DE) .......................... 102021115389.1

(51) Int. Cl.
*B23P 19/08* (2006.01)
*B23P 19/04* (2006.01)
*B65G 47/91* (2006.01)
*H01M 10/04* (2006.01)

(52) U.S. Cl.
CPC .............. *B23P 19/04* (2013.01); *B65G 47/91* (2013.01); *H01M 10/0404* (2013.01)

(58) Field of Classification Search
CPC ......... B23P 19/04; B23P 19/007; B23P 19/08; B23P 19/02; B23P 19/12; B65G 47/91; H01M 10/0404; B25J 15/019; B25J 9/1687; F21V 31/03
See application file for complete search history.

(56) References Cited

U.S. PATENT DOCUMENTS

| | | | |
|---|---|---|---|
| 2014/0125081 A1* | 5/2014 | Pares Isanta | B62D 25/24 296/1.06 |
| 2019/0321982 A1* | 10/2019 | Sobel | B23P 19/02 |
| 2019/0329366 A1* | 10/2019 | Park | B25J 11/005 |

\* cited by examiner

*Primary Examiner* — Jun S Yoo
(74) *Attorney, Agent, or Firm* — Maier & Maier, PLLC

(57) ABSTRACT

A process arrangement for carrying out a fully automatic setting process, in which a setting device drives a clip element into a component pilot hole. The process arrangement has a transfer unit, in particular a robot, to which the setting device is attached, and the transfer unit is adjustable between a pickup position, in which the setting device grabs the clip element, and a setting position, in which the setting device drives the clip element into the component pilot hole.

19 Claims, 8 Drawing Sheets

PROCESS ARRANGEMENT FOR CARRYING OUT A FULLY AUTOMATIC SETTING PROCESS

FIELD

The invention relates to a process arrangement for carrying out a fully automatic setting process, and to a method for carrying out such a setting process.

BACKGROUND

The battery housing of a high-voltage battery system of a motor vehicle has at least one vent valve, via which excess pressure in the battery housing can be relieved, if necessary. The vent valve can be implemented as a plastic clip with an integrated sealing membrane. In the assembled state, the plastic clip is in snap-in connection with a pilot hole located in the battery housing.

In large-scale production, the high-voltage battery system is assembled in an automated process chain, with the exception of the vent valve assembly. The vent valve, on the other hand, is set manually. Therefore, to enable such manual setting of the vent valve, the automated process chain must be interrupted, which increases the process time for completion of the high-voltage battery system. Furthermore, the setting process requires pressing force of over 100 N to release the plastic clip. This means that the setting process can only be carried out by the worker with a further auxiliary device in order to meet the ergonomic requirements for a permanent workstation.

A plug setting tool is known from DE 20 2014 102 558 U1. An installation tool for a clip element is known from US 2019/0337103 A1. A device for the automated setting of a clip element is known from KR 20200007131 A. JP 2017047516 A discloses another device for automated setting of a clip element.

SUMMARY

The object of the invention is to provide a process arrangement and a method by means of which a clip element, in particular a vent valve, can be inserted into a component pilot hole in a fully automated setting process in a simple and reliable manner.

The invention relates to a process arrangement for carrying out a fully automated setting process. In the setting process, a setting tool drives a clip element into a component pilot hole. The process arrangement according to the invention has a transfer unit, in particular a robot, to which the setting device is attached. The transfer unit is adjustable between a pickup position and a setting position. In the transfer unit pickup position, the setting device grabs the clip element. In the transfer unit setting position, the setting device drives the clip element into the component pilot hole.

The invention thus relates to a method for setting these plastic clips, which method can be fully interlinked in automated production. A robot-guided setting device is to be used for this purpose, which picks up the plastic clips from a supply unit and sets them into the component in the correct position. The difficulty is that position tolerances can arise that are critical to the process reliability of an automated process. This is especially true if no sensors are to be used for position detection.

The invention covers a method with which, in particular, round plastic clips can be inserted in a process-safe and robot-guided manner. The following steps are implemented:

A supply unit can be used in which a clip element is separated from bulk material in such a way that it can be picked up by the robot in the subsequent process. An optional design can be such that several plastic clips can be transferred to the setting device in one pickup process.

In addition, a setting unit can consist of a device, which is mounted on the robot and can grab the separated part without damaging it and can hold it in a precise position. Furthermore, the device can be used to apply a force in order to be able to place the plastic clip in a component with a pilot hole and push it into head contact until the retaining mechanism of the clip allows the clip to automatically snap into place. The force should be high enough to ensure that the plastic clip can also be equipped with a deformable seal which can be deformed by the setting force to such an extent that the retaining mechanism (for example, deformable rest lugs) of the clips still releases securely. An optional version comprises a magazine, so that several clips can be carried by the setting tool. The following functions can be integrated in the setting unit: precise centering of the plastic clip, a slider with a predefined setting stroke (e.g. 35 mm), position monitoring and force monitoring (force increase for end position). For example, the setting drive can be a pneumatic or electric motor drive.

In order to be able to guarantee a reliable setting process, the control of position tolerances is of fundamental importance. The following measures are implemented for this purpose: The plastic clip has an insertion bevel with which a positional deviation during the setting process in a transverse plane (aligned transversely with respect to the setting direction) of at least 2 mm between the plastic clip and the receiving hole can be overcome without a blocked position occurring between the prepunched component and the plastic clip, i.e. the clip can be inserted with low force during the setting process. The plastic clip is designed so robustly that it does not suffer any permanent deformation when subjected to loads of 200 N in the axial direction. The robot-guided setting unit carries a mechanism that allows the plastic clip to be initially extracted in a centered position and held firmly, while transitioning to a floating position along a travel distance to reduce stresses on the clip during the setting process.

Furthermore, the robot-guided setting device has a process monitoring system that can be used to monitor whether the setting process has actually been carried out and whether a travel distance has been covered that is plausibly matched to the geometry of the plastic clips for triggering the retaining mechanism.

Furthermore, a device (hereinafter referred to as a positioning aid or teaching aid) may be provided to facilitate robot positioning. This can be designed in such a way that it can be fixed in the setting device. The positioning aid fixed in the setting device can be used to approach both the pickup position and the setting position (in the pilot hole).

Thus, an exact programming position of the robot in the spatial directions x, y and z as well as in the rotational directions around these axes can be specified both for picking up the clip and for the home position for the setting process.

With the invention, an automated and process-reliable assembly of, in particular, round plastic clips can be realized. In particular, the invention relates to a method for the process-reliable insertion of round plastic clips into components having pilot holes. It comprises a supply unit for bulk material with a separating unit, from which at least one part can be picked up by a movable device, such as a robot. In addition, the invention comprises a setting device with which a plastic clip can be picked up in a positionally accurate and loss-proof manner, a feed movement can be applied with an adjustable force of up to 500 N, but in particular up to 200 N, and to which signaling devices are attached with which the course of the process can be monitored. Furthermore, a process control can be provided with which the process sequence can be parameterized and the setting process can be monitored and controlled. An auxiliary device can also be provided to significantly facilitate positioning of the setting device to pick up and set the plastic clip in a moving device, for example a robot, and to increase accuracy.

The essential aspects of the invention are again highlighted in detail below: For example, for use in large-scale production, the process arrangement can have a supply station in which clip elements are stored as bulk material. In the supply station, a clip element separation takes place in which at least one clip element is provided in the pickup position so that an automatic clip element transfer to the setting device can be carried out. For example, a clip element magazine can be associated with the setting device. In this case, the setting device can carry a number of clip elements arranged in the clip element magazine.

In one technical implementation, the setting device can have a setting piston that is linearly adjustable along an actuation stroke. This can be adjusted between a retracted setting piston end position and an extended setting piston end position. In the extended setting piston end position, the clip element is driven into the component pilot hole.

From a manufacturing point of view, it is advantageous if, in the transfer unit pickup position, the setting piston grips the clip element by means of negative pressure. For this purpose, the piston can have at least one suction opening which can be connected to a vacuum source and with the aid of which the clip element can be brought into suction contact with a setting piston contact surface.

The following describes the sequence of movements of the transfer unit and the setting piston during a pickup process: Initially, the transfer unit is moved to the pickup position. The transfer unit remains stationary in the pickup position. The setting piston is then moved from its retracted end position to the extended end position along the setting stroke. In the extended end position, the setting piston grabs the clip element, in particular by means of negative pressure. At the end of the pickup process, the setting piston with the clip element attached is returned to the retracted end position. After the pickup process, the transfer process starts, during which the transfer unit moves the setting device along a transfer path to the transfer unit setting position. The transfer unit remains stationary in its setting position with unchanged spatial coordinates. The setting piston with the clip element mounted on it is moved from its retracted end position to the extended end position along the setting stroke. In the extended end position, the clip element is driven by the setting piston into the component pilot hole. After driving the clip element into the component pilot hole, the vacuum that grips the clip element can optionally be deactivated. The setting piston is then returned to its retracted end position.

A positionally accurate alignment of the clip element held on the setting piston is of paramount importance. With this in mind, the setting piston can have a centering element by means of which transverse movement of the clip element at the setting piston contact surface is prevented, in particular during the transfer process. During the setting process, the centering element can be moved out of centering engagement with the clip element along the setting stroke. In this way, a slight transverse movement of the clip element is allowed at the setting piston contact surface to realize a floating clip element support. In this way, a positional deviation between the component pilot hole and the clip element can be compensated. To further compensate for component and/or manufacturing tolerances, the clip element can have an insertion bevel, in particular a cone-like bevel, at its element tip.

The process arrangement according to the invention can be assigned a process control system by means of which the motion sequences of the setting device and of the transfer unit are controlled. The process control can also be in signaling connection with end position sensors and/or force measurement sensors or displacement sensors. With the help of these, a force and/or travel curve of the setting piston can be detected during the setting stroke and compared with corresponding set values. In the event of a significant deviation of the actual values from the set values, the process control system detects a fault condition.

In one technical implementation, the transfer unit can be a program-controlled industrial robot. The setting device may be mounted on a distal end of a robot arm of the industrial robot. In this case, a teach-in process can be performed before the setting process is carried out, in which the industrial robot moves to the pickup position and the setting position without program control, for example by means of a programmer. The spatial coordinates of the industrial robot in the pickup position and in the setting position are stored in the program control. After completion of the teach-in process, the industrial robot can thus autonomously approach the pickup and setting positions with the help of the program control.

The centering element can be a centering sleeve, for example. This can be elastically supported on the setting piston in the setting direction. In the transfer process and to start the setting process, the centering sleeve can project axially beyond the setting piston with the clip element held on it. During the setting stroke, one end face of the centering sleeve therefore first comes into contact with the opening edge region of the component pre-punch block. The stroke of the setting piston continues to be adjusted using up the axial protrusion until the extended setting piston end position is reached.

As an example, the clip element can be placed on a ground surface of the supply station in the pickup position. In this position, the clip element can be secured against lateral slipping by a suitable device or gripping means.

A positioning aid (i.e. teaching aid) can be provided for performing the teach-in process. The positioning aid can have a positioning aid head and a positioning aid shaft. The positioning aid can be implemented in the form of a bolt and extend over a component length along the bolt axis. The component length can preferably be the sum of the setting stroke and the clip element component length. The determination of the pickup coordinates of the industrial robot can be carried out as follows in this case: the positioning aid is held with its positioning aid head on the setting piston (in particular by means of suction contact). The industrial robot drops the positioning aid with its shaft tip on the ground surface of the supply station with the help of a programmer, for example, without program control. The spatial coordinates of the industrial robot in the process are stored as pickup position coordinates in the program control.

The clip element may have an element head with an element shaft extension. In the assembled state, the element shaft can project into the component pilot hole while the element head is supported on the opening edge region of the component pilot hole.

The positioning aid shaft can be dimensioned in such a way that it can be inserted into the component pilot hole with a small hole clearance (analogous to the clip element shaft). In addition, a ring collar can be formed on the positioning aid shaft. This can be spaced from the element head in the axial direction by an axial offset. The axial offset can essentially correspond to the setting stroke travel. In this case, the setting position coordinates of the industrial robot are determined as follows: with the aid of a programmer (i.e. without program control), the industrial robot inserts the positioning aid with its shaft tip into the component pilot hole until the ring collar (analogous to the element head of the clip element) comes into circumferential contact with the opening edge region of the component pilot hole. The spatial coordinates of the industrial robot are stored in the process as pickup position coordinates in the program control.

It is preferable if the positioning aid held by the setting piston projects axially beyond the centering sleeve by an oversize. With the positioning aid inserted in the component pilot hole, a free annular gap thus remains between the centering sleeve and the component. The free annular gap serves as a viewing window through which the positioning aid can be positioned by means of visual inspection.

BRIEF DESCRIPTION OF THE FIGURES

An exemplary embodiment of the invention is described below by means of the appended figures. In the figures.

DETAILED DESCRIPTION

Figure 1:
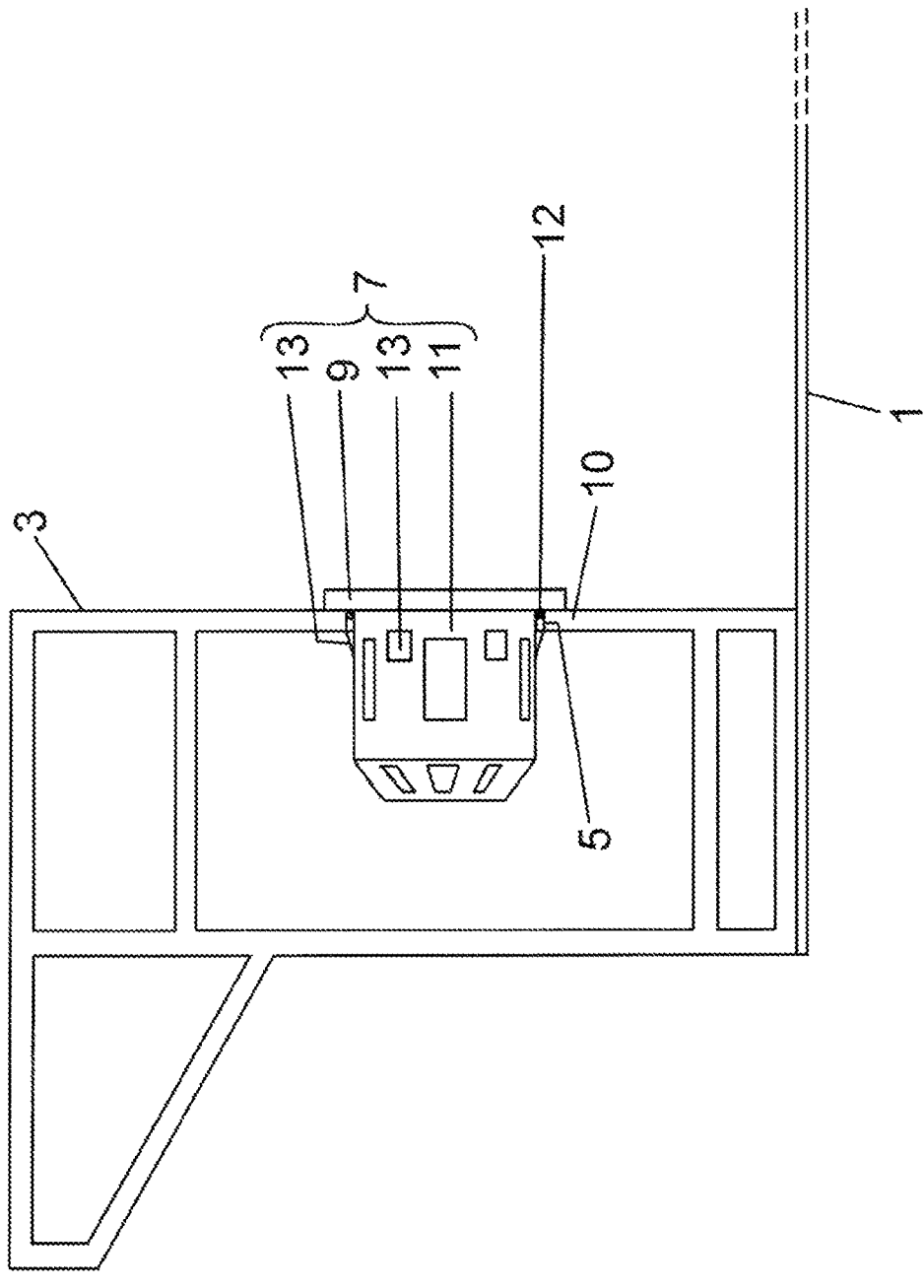
FIG. 1 shows a partial sectional view of a vent valve mounted in a battery housing wall.

FIG. 1 partially shows a lower housing part of a battery housing of a high-voltage battery system for a vehicle. The lower housing part has a housing base 1 with a housing side wall 3 raising therefrom. A vent valve 7 is inserted in a pilot hole 5 in the housing side wall 3. In FIG. 1, the vent valve 7 is a plastic clip or clip element 7 with an integrated sealing membrane that is not shown. The clip element 7 has an expanded element head 9, which is supported on an opening edge region 10 of the pilot hole 5. In addition, the clip element 7 has an element shaft 11 that protrudes through the pilot hole 5. Latching projections 13 are formed on the outer circumference of the element shaft 11, which projections engage under the opening edge region 10 of the pilot hole 5. In FIG. 1, the clip element 1 is provided with a deformable sealing ring 12, which is only schematically indicated. This is positioned at the transition between the element shaft 11 and the element head 9.

Figure 2:
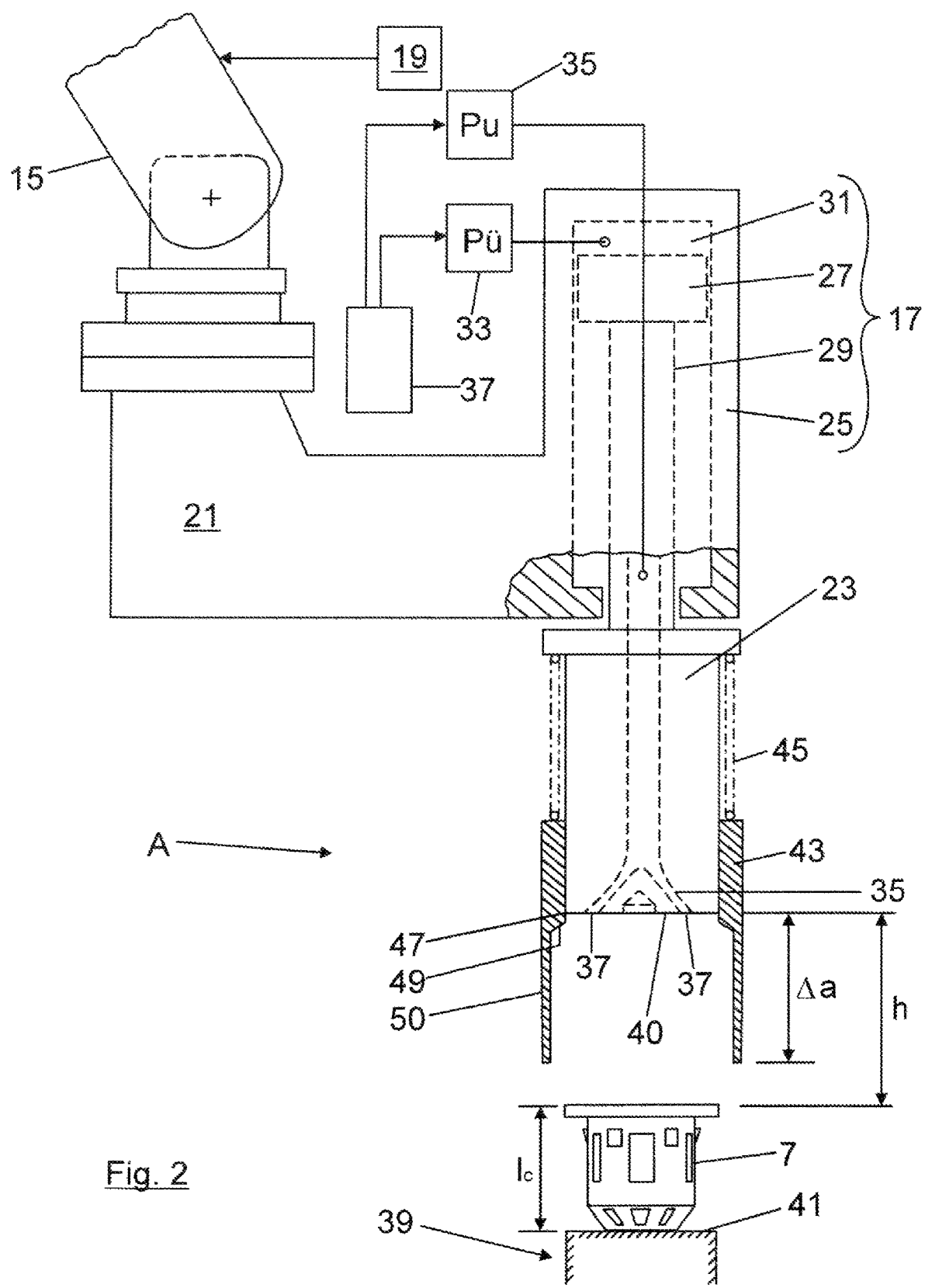
FIG. 2 shows a view illustrating an automated setting process.

In the following, a process arrangement is described with reference to FIGS. 2 to 5, by means of which arrangement an automated setting process is carried out, in which the clip element 7 is mounted in the housing side wall 3: the process arrangement has as a transfer unit formed by an industrial robot 15 with an sketched robot arm, at the distal end of which a setting device 17 is mounted. In FIG. 2, the robot 15 is moved autonomously by means of a program control 19 between a pickup position A, described later, and a setting position S. As can be further seen in FIG. 2, the setting device 17 has a bracket 21 mounted on the robot arm of the industrial robot 15. The bracket 21 carries a pneumatic unit, shown schematically, by means of which a setting piston 23 of the setting device 17 can be driven. In FIG. 2, the pneumatic unit has a pneumatic cylinder 25 with a pneumatic piston 27. The pneumatic piston 27 is connected in a force-transmitting manner to the setting piston 23 via a piston rod 29. On the side opposite to the piston rod 29, the pneumatic cylinder 25 has a pressurizable working chamber 31, which is connected to an overpressure source 33. In addition, the setting piston 23 has suction channels 35. These open into suction openings 37 formed in a setting piston contact surface 40. The suction channels 35 are in operative connection with a vacuum source 35. Both the vacuum source 35 and the overpressure source 33 can be controlled by a control unit 37 of the setting device 17.

By means of the control unit 37, the stroke of the setting piston 23 is linearly adjustable between a retracted setting piston end position (FIGS. 2 and 4) and an extended setting piston end position (FIGS. 3 and 5) over a setting stroke h. By means of the program control 19, the industrial robot 15 can be autonomously adjusted between the pickup position A shown in FIGS. 2 and 3 and the setting position S (FIGS. 4 and 5) along a transfer path.

A supply station 39 (FIG. 2 or 3) is associated with the process arrangement. In FIG. 2, a clip element 7 is provided in the pickup position A. In FIG. 2, the clip element 7 is placed on a ground surface 41 of the supply station 39. In this position, the clip element can be secured against lateral slipping by a suitable device or gripping means.

Figure 3:
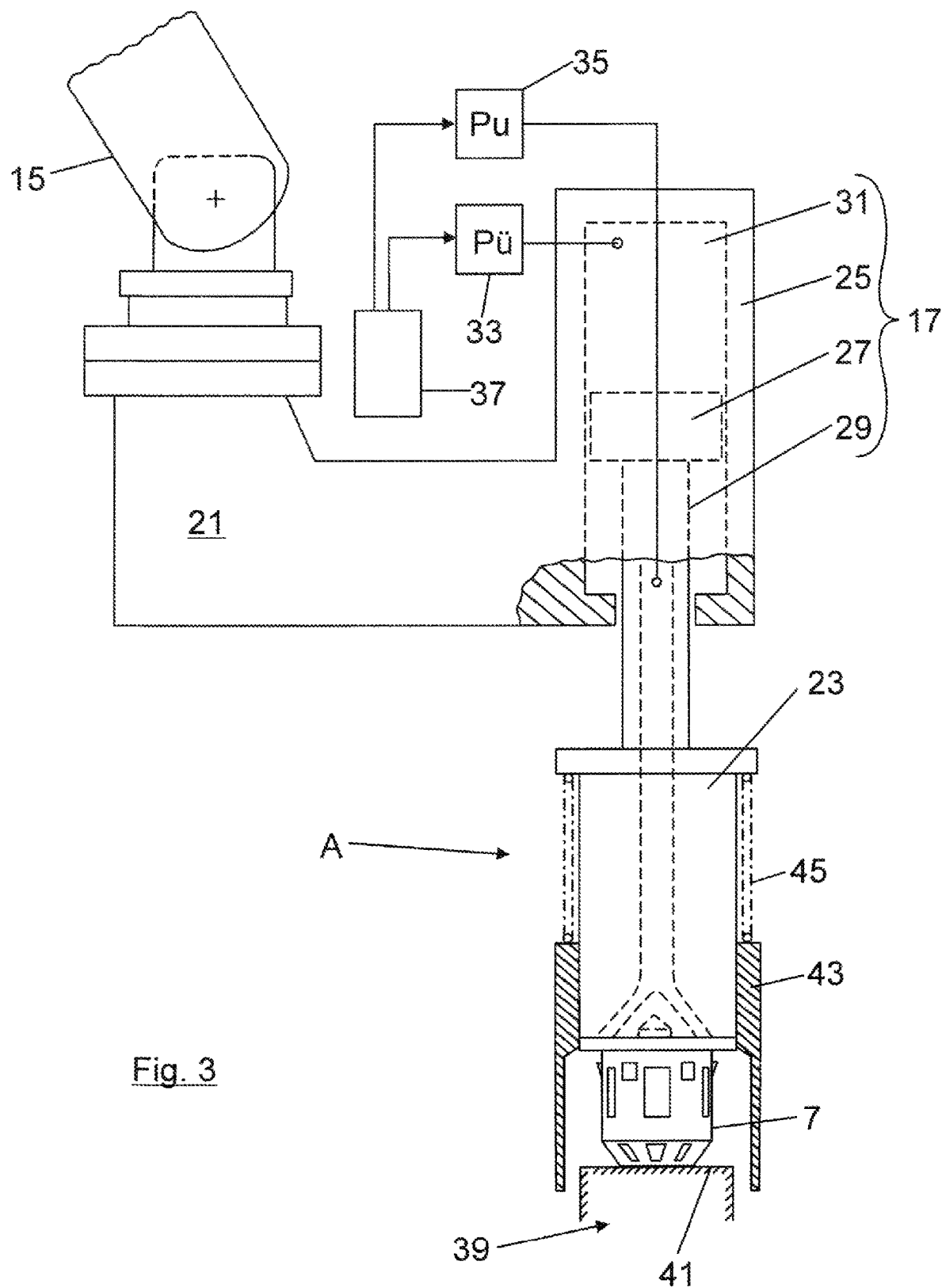
FIG. 3 shows another view illustrating an automated setting process.

To grab the clip element 7, the setting piston 23 is displaced by a setting stroke h from its retracted setting piston end position (FIG. 2) to its extended setting piston end position (FIG. 3). In the extended setting piston end position (FIG. 3), the setting piston contact surface 40 is in contact with the upper side of the element head 9 of the clip element 7. By activating the vacuum source 35, a suction contact is established between the clip element 7 and the setting piston 23. In this way, the clip element 7 is transferred with the industrial robot 15 along a transfer path to the setting position S of the industrial robot 15 (FIGS. 4, 5).

As can be further seen in FIG. 2, the setting piston 23 has a centering sleeve 43. The centering sleeve 43 is elastically resiliently supported on the setting piston 23 in the setting direction by a spring element 45.

According to FIG. 2, a small-diameter centering contour 47 is formed on the inner circumference of the centering sleeve 43, which merges into a large-diameter inner circumference 50 at a conical annular shoulder 49. The small-diameter centering contour 47 surrounds the element head 9 of the clip element 7 with slight hole play (FIG. 3). In this way, transverse movement of the clip element 7 at the setting piston contact surface 39 is prevented during the transfer process.

Figure 4:
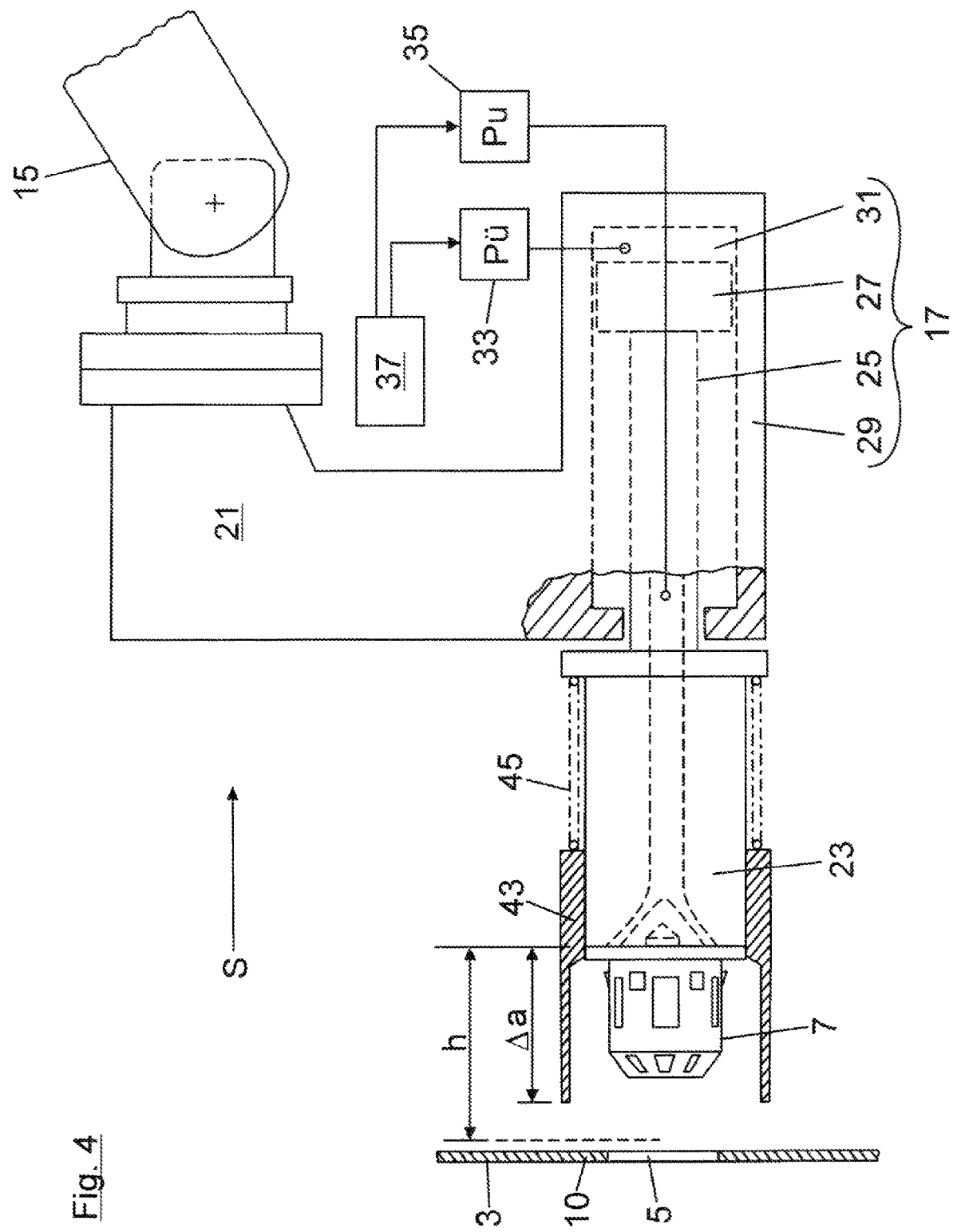
FIG. 4 shows another view illustrating an automated setting process.
Figure 5:
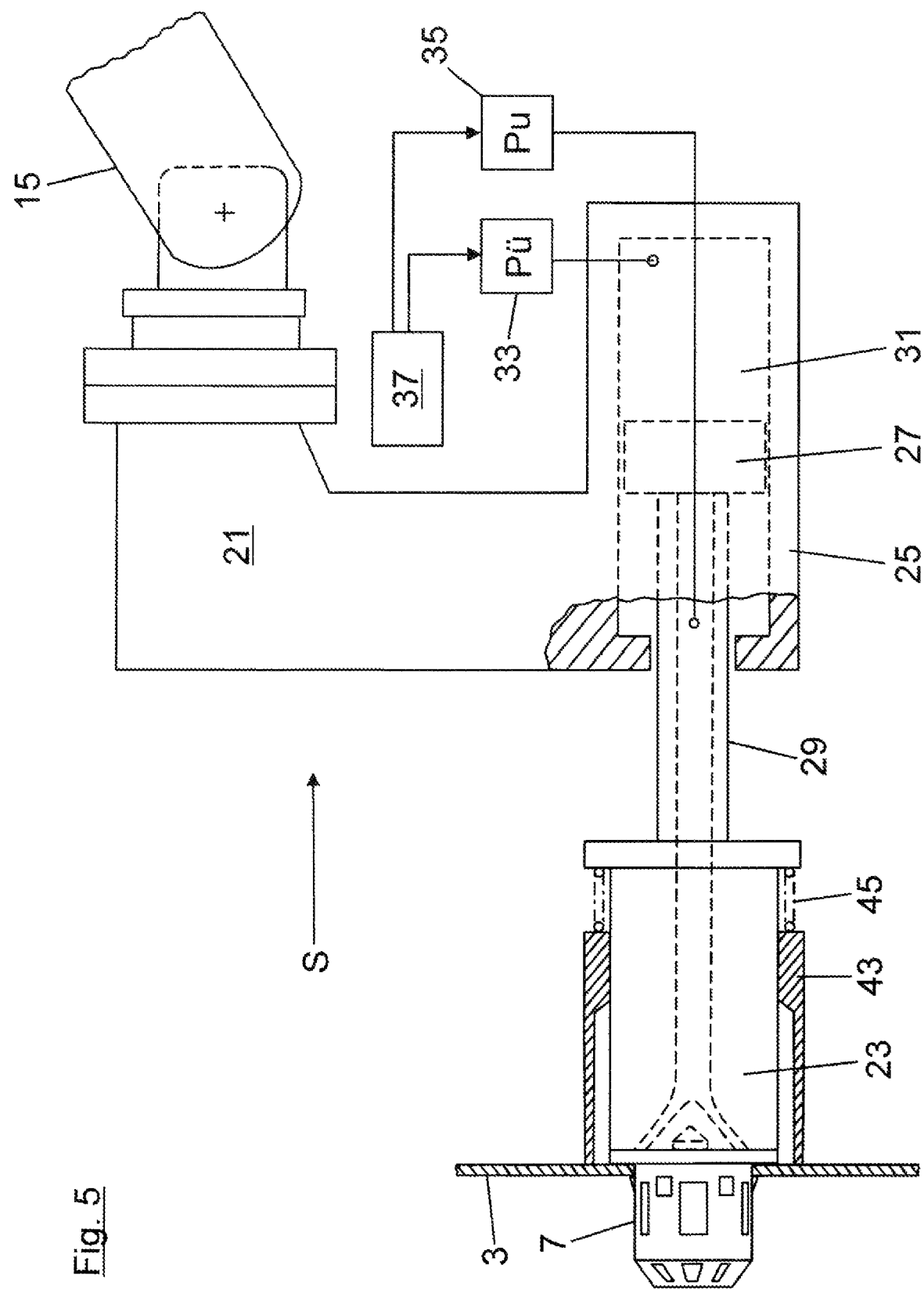
FIG. 5 shows another view illustrating an automated setting process.

After grabbing the clip element 3, the setting piston 23 is returned to its retracted setting piston end position (FIG. 4). The transfer process then starts, during which the industrial robot 15 transfers the clip element 7 to the setting position S (FIG. 4). During the transfer process and at the start of the setting process, the centering sleeve 43 projects beyond the setting piston 23 with an axial projection Δa (FIG. 4).

To start the setting process, the setting piston 23 with the clip element 7 held on it is moved from the retracted setting piston end position along the setting stroke h to the extended setting piston end position. In the extended setting piston end position, the clip element 7 is driven by the setting piston 23 into the pilot hole 5 of the housing side wall 3. After driving the clip element 7 into the pilot hole 5, the vacuum source 35 can be deactivated and the suction contact to the clip element 7 can be removed. The setting piston is then returned to its retracted end position.

Following the setting process, the industrial robot 15 is transferred back to its pickup position A by means of the program control 19 in order to start a subsequent pickup process.

Figure 6:
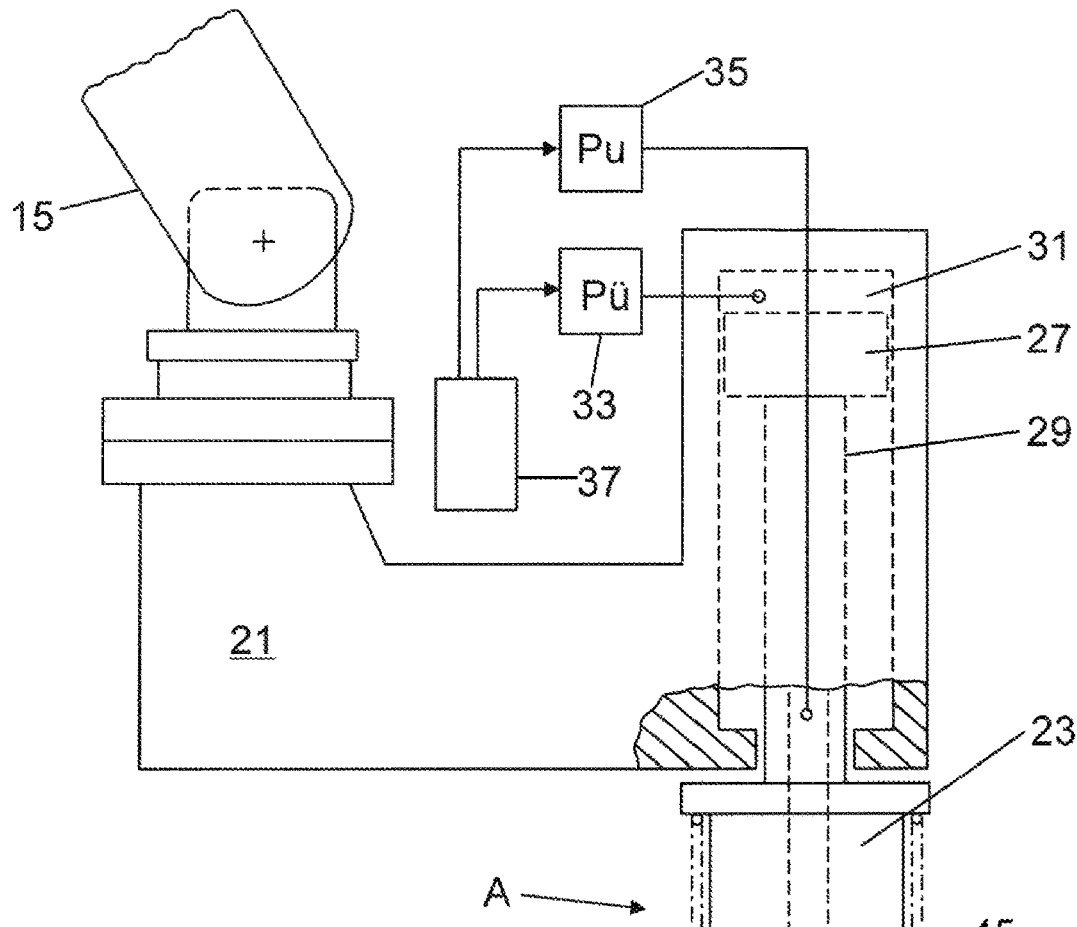
FIG. 6 shows a view illustrating a teach-in process.
Figure 7:
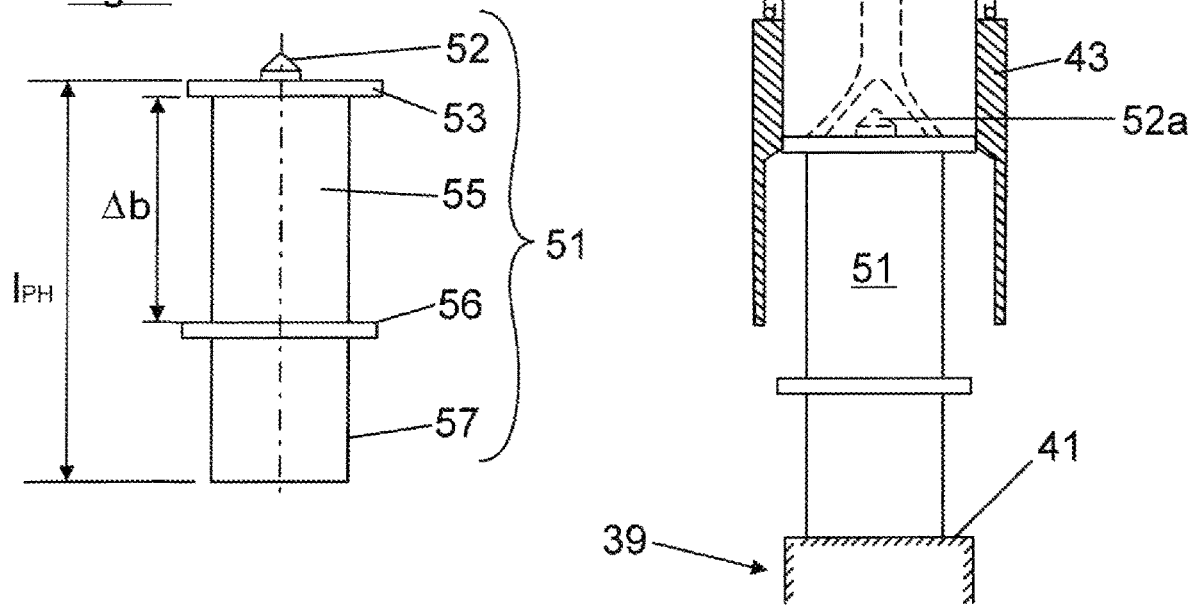
FIG. 7 shows another view illustrating a teach-in process.
Figure 8:
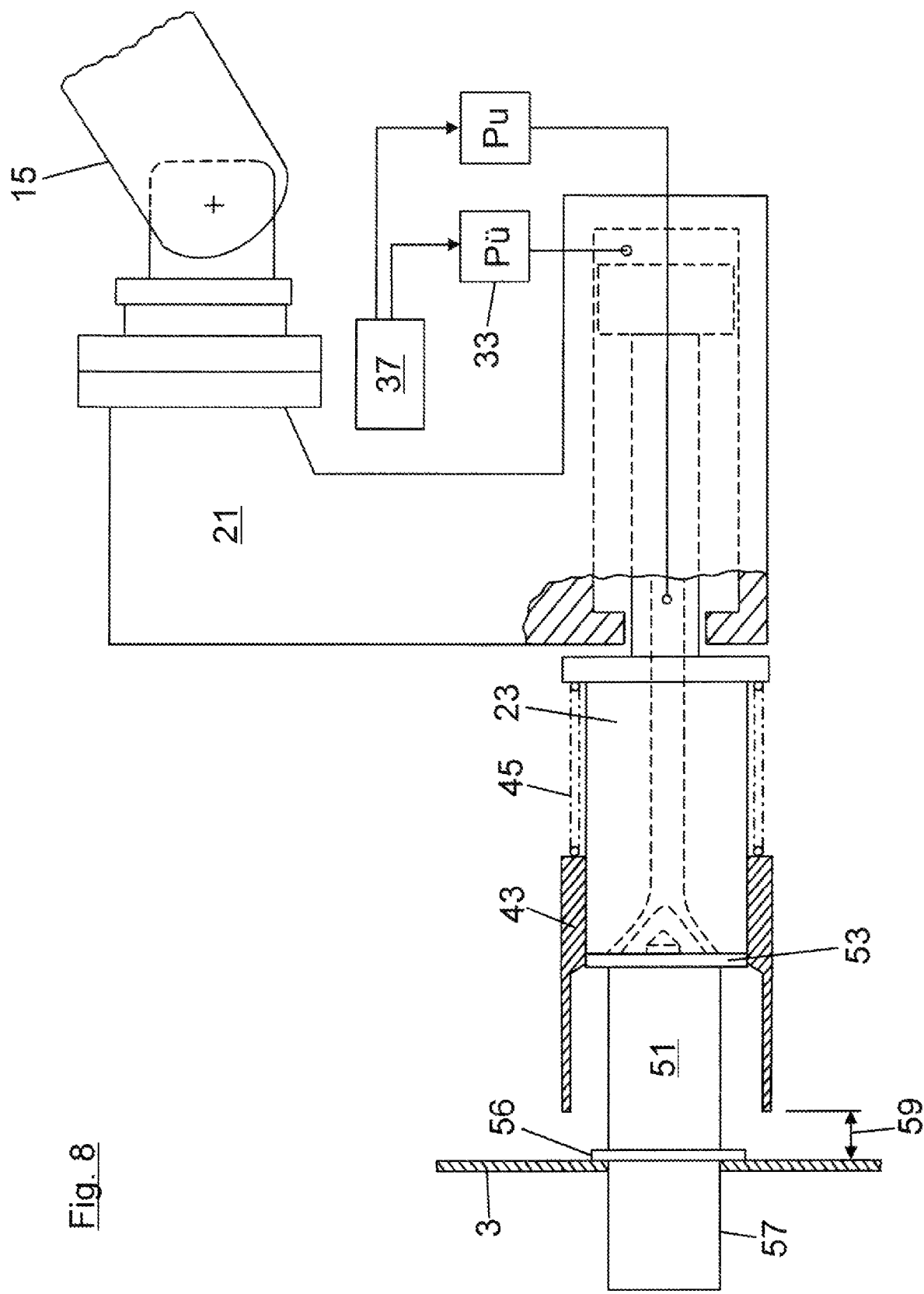
FIG. 8 shows another view illustrating a teach-in process.

Before the setting process is carried out, a teach-in process described on the basis of FIGS. 6 to 8 is performed. A positioning aid 51 as shown in FIG. 7 is provided for performing the teach-in process. The pin-shaped positioning aid 51 has a positioning aid head 53 and a positioning aid shaft 55. By means of the centering tip 52 and the centering hole 52a, the positioning aid 51 can be received in the correct position and centrally by the setting device 17. The pin-shaped positioning aid 51 extends along the pin axis over a component length l. This corresponds to the sum of the setting stroke h and the clip element component length $l_C$. In addition, a ring collar 56 is formed on the positioning aid shaft 55. This is spaced from the positioning aid head 53 in the axial direction by an axial offset Δb. The axial offset Δb corresponds to the setting stroke h. At the tip of the shaft 57, the positioning aid shaft 55 has an outer diameter that can be inserted into the pilot hole 5 with a small amount of hole clearance.

The spatial coordinates of the industrial robot 15 in the pickup position A (FIGS. 2, 3, 6) are determined as follows: the positioning aid 51 with its positioning aid head 53 is held on the setting piston 23 by means of negative pressure. The industrial robot 15 guides the positioning aid 51 with its shaft tip 57 into contact with the ground surface 41 of the supply station 39. This is done without program control by means of a programmer. The spatial coordinates of the industrial robot 15 are stored in the process as pickup position coordinates in the program control 19.

The spatial coordinates of the industrial robot 15 in the setting position S are determined as follows: the positioning aid 51 is also held by its positioning aid head 53 on the setting piston 23. The industrial robot 15 inserts the positioning aid 51 with its shaft tip 57 into the component pilot hole 5 until the ring collar 56 is in circumferential contact with the opening edge region of the pilot hole 5. The spatial coordinates of the industrial robot 15 are stored in the process as setting position coordinates in the program control 19.

For an exact determination of the setting position coordinates and the pickup position coordinates, a correct positioning of the positioning aid 51 in the pilot hole 5 of the housing side wall 3 is of great importance. With this in mind, the centering sleeve 43 is dimensioned in such a way that the positioning aid 51 held by the setting piston projects axially beyond the centering sleeve 43 by an oversize (FIG. 6 or 8). When the positioning aid 51 is inserted in the pilot hole 5, a free annular gap 59 (FIG. 8) therefore remains between the centering sleeve 43 and the housing side wall 3. The free annular gap 59 serves as a viewing window through which the position of the positioning aid 51, in particular a wide surface contact of the ring collar 56 with the opening edge region of the pilot hole, can be viewed from the outside, so that a visual inspection is possible.

Figure 9:
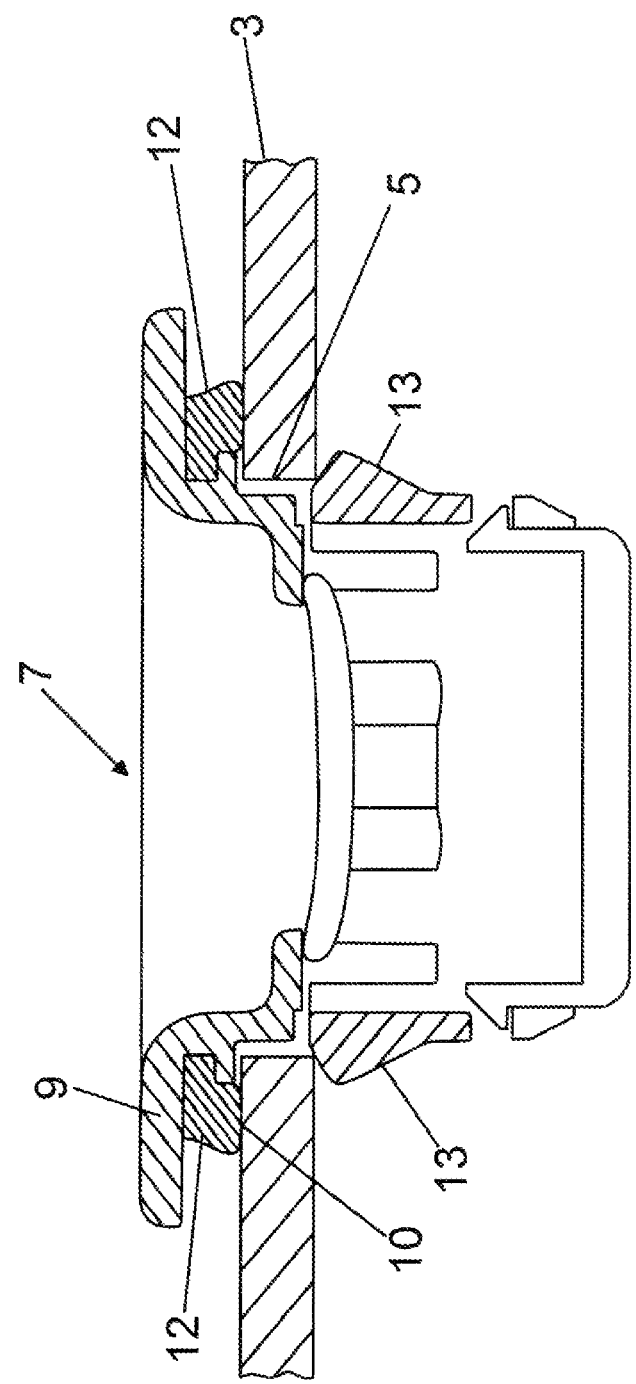
FIG. 9 shows a view corresponding to FIG. 1, of a concretized embodiment variant of the invention.

FIG. 9 shows a concretized embodiment in which the clip element 7 is inserted into the pilot hole 5 of the housing side wall 3 of the battery housing. The clip element 7 shown in FIG. 9 is of essentially identical construction to the clip element 7 indicated in FIGS. 1 to 5. In contrast to FIGS. 1 to 5, in FIG. 9 the deformable sealing ring 12 is positioned between the element head underside and the opening edge region 10 of the pilot hole 5. In the setting process, the setting force is such that, on the one hand, the retaining mechanism (i.e. the latching projections 13) of the clip element 7 is reliably triggered and, on the other hand, the sealing ring 12 is elastically deformed, creating a sealing effect.

LIST OF REFERENCE NUMERALS 1 ground
3 housing side wall
5 pilot hole
7 clip element
9 element head
10 opening edge region
11 shaft
12 sealing ring
13 latching projections
15 industrial robot
17 setting device
19 program control
21 bracket
23 setting piston
25 pneumatic cylinder
27 pneumatic piston
29 piston rod
31 working chamber
33 overpressure source
35 suction channels
37 suction openings
39 supply station
40 setting piston contact region
41 ground surface
43 centering sleeve
45 spring element
47 small-diameter centering contour
49 conical annular shoulder
50 large-diameter inner circumference
51 positioning aid
52 centering tip
52a centering hole
53 positioning aid head
55 positioning aid shaft
56 ring collar
57 shaft tip
59 free annular gap
$l_C$ clip element length
$l_{PH}$ positioning aid length
Δa axial projection
Δb axial offset
S setting position
A pickup position

The invention claimed is:

1. A process arrangement for carrying out a fully automatic setting process, in which a setting device drives a clip element into a component pilot hole, wherein the process arrangement has a transfer unit, a robot, to which the setting device is attached, and wherein the transfer unit is adjustable between a pickup position, in which the setting device grabs the clip element, and a setting position, in which the setting device drives the clip element into the component pilot hole; wherein the setting process starts after a transfer process, and, in order to carry out the setting process, the transfer unit is initially moved into its setting position and remains stationary there, and a setting piston with the clip element held thereon is moved from a retracted end position along a setting stroke into an extended end position in which the clip element is driven in by the setting piston, and, after the clip element has been driven into the component pilot hole, the setting piston is returned into its retracted end position, and the setting piston has a centering element by which a transverse movement of the clip element at a setting piston contact surface is prevented during the transfer process, and during the setting process in the course of the setting stroke, the centering element is brought out of centering engagement with the clip element, whereby the transverse movement of the clip element at the setting piston contact surface is allowed in order to realize a floating clip element support, by which a positional deviation between the component pilot hole and the clip element is compensated.

2. The process arrangement according to claim 1, wherein the process arrangement has a supply station in which clip elements are stored as bulk material, and clip element separation takes place by the supply station, in which at least one clip element is supplied in the pickup position, so that an automatic clip element transfer to the setting device is carried out, and the setting piston which is adjusted linearly along an adjustable stroke which is adjusted between the retracted end position and the extended end position in which the clip element is driven into the component pilot hole, and in the transfer unit pickup position, the setting piston grabs the clip element, by negative pressure, so that the clip element is transferred with the transfer unit to the setting position, and the setting piston has at least one suction opening which is connected to a vacuum source and by which the clip element is brought into suction contact with the setting piston contact surface.

3. The process arrangement according to claim 2, wherein the centering element is a centering sleeve which is elastically resiliently supported on the setting piston in the setting direction, and, during the transfer process and at the start of the setting process, the centering sleeve projects beyond the setting piston with an axial projection, and in the course of the setting stroke, the centering sleeve comes into contact with an opening edge region of the component pilot hole, while the stroke of the setting piston is further adjusted, using up an axial protrusion, until the extended setting piston end position is reached, and, in the pickup position, the clip element is deposited on a ground surface of the supply station, and a positioning aid has a positioning aid head and a positioning aid shaft, and the positioning aid extends over a component length which corresponds to the sum of the setting stroke and a clip element component length, so that for determining the spatial coordinates of the industrial robot in the pickup position the positioning aid is held with its positioning aid head on the setting piston and is centered by a centering tip and a centering hole, and the industrial robot places the positioning aid without program control, by a programmer, with its shaft tip on a base surface of the supply station in the correct position, and the spatial coordinates thereby assumed by the industrial robot is stored in the program control as pickup position coordinates.

4. The process arrangement according to claim 3, wherein the clip element has an element head which is extended by an element shaft, and, in the assembled state, the element shaft projects into the component pilot hole and the element head is supported on the opening edge region of the component pilot hole, and the positioning aid shaft is inserted into the component pilot hole with a small hole clearance, and a ring collar is formed on the positioning aid shaft, wherein the ring collar is spaced apart from the positioning aid head in an axial direction by an axial offset which corresponds to a setting stroke travel, so that, for determining the spatial coordinates of the industrial robot in the setting position, the positioning aid is held with its positioning aid head on the setting piston and is centered by the centering tip and the centering hole, in suction contact, and the industrial robot positions the positioning aid without program control, by a programmer, with its shaft tip into the component pilot hole until the ring collar is in contact with the opening edge region of the component pilot hole, and the spatial coordinates thereby assumed by the industrial robot is stored as setting position coordinates in the program control.

5. The process arrangement according to claim 4, wherein the clip element is equipped with a sealing ring which, in the assembled state, is positioned between an element head underside and the opening edge region of the pilot hole, and in the setting process, a setting force is dimensioned in such a way that, on the one hand, a retaining mechanism, of the clip element is reliably triggered and, on the other hand, the sealing ring is elastically deformed, building up a sealing effect.

6. The process arrangement according to claim 3, wherein the positioning aid held by the setting piston projects axially beyond the centering sleeve by an oversize, so that when the positioning aid is inserted into the component pilot hole, a free annular gap remains between the centering sleeve and the component, so that the position of the positioning aid is checked by visual inspection.

7. The process arrangement according to claim 2, wherein, in order to carry out a pickup process, the transfer unit is initially moved into the pickup position and remains stationary there, and the setting piston is then moved from its retracted end position along the setting stroke into the extended end position, in which the setting piston grabs the clip element, and at the end of the pickup process, the setting piston with the clip element held thereon is returned to the retracted end position, and the transfer process starts after the pickup process has been completed.

8. The process arrangement according to claim 2, wherein the setting process starts after the transfer process, and, in order to carry out the setting process, the transfer unit is initially be moved into its setting position and remains stationary there, and the setting piston with the clip element held thereon is then moved from the retracted end position along the setting stroke into the extended end position in which the clip element is driven in by the setting piston, and, after the clip element has been driven into the component pilot hole, the setting piston is returned into its retracted end position, and the setting piston has a centering element by which a transverse movement of the clip element at the setting piston contact surface is prevented during the transfer process, and during the setting process in the course of the setting stroke, the centering element is brought out of centering engagement with the clip element, whereby a transverse movement of the clip element at the setting piston contact surface is allowed in order to realize a floating clip element support, by which a positional deviation between the component pilot hole and the clip element is compensated.

9. The process arrangement according to claim 2, wherein in order to compensate for component and manufacturing tolerances, the clip element has at its element tip a conical insertion bevel, and a process control having a force measurement sensor and a displacement sensor is provided, with which a force and displacement variation of the setting piston is detected and compared with corresponding set values, wherein the process control recognizes a fault when a significant deviation from the set values is determined, and the transfer unit is a program-controlled industrial robot, and the setting device is mounted on a distal end of a robot arm of the industrial robot, and before the setting process is carried out, a teach-in process is carried out, in which the industrial robot, without program control, by a programmer, approaches the pickup position and the setting position and the spatial coordinates of the industrial robot in the pickup position and in the setting position are stored in the program control, so that after completion of the teach-in process the industrial robot autonomously moves to the pickup and setting positions by the program control.

10. The process arrangement according to claim 2, wherein the clip element has an element head which is extended by an element shaft, and, in the assembled state, the element shaft projects into the component pilot hole and the element head is supported on the opening edge region of the component pilot hole, and the positioning aid shaft is inserted into the component pilot hole with a small hole clearance, and a ring collar is formed on the positioning aid shaft, wherein the ring collar is spaced apart from the positioning aid head in an axial direction by an axial offset which corresponds to a setting stroke travel, so that, for determining the spatial coordinates of the industrial robot in the setting position, the positioning aid is held with its positioning aid head on the setting piston and is centered by the centering tip and the centering hole, in suction contact, and the industrial robot positions the positioning aid without program control, by a programmer, with its shaft tip into the component pilot hole until the ring collar is in contact with the opening edge region of the component pilot hole, and the spatial coordinates thereby assumed by the industrial robot is stored as setting position coordinates in the program control.

11. The process arrangement according to claim 1, wherein, in order to carry out a pickup process, the transfer unit is initially moved into the pickup position and remains stationary there, and the setting piston is then moved from its retracted end position along the setting stroke into the extended end position, in which the setting piston grabs the clip element, and at the end of the pickup process, the setting piston with the clip element held thereon is returned to the retracted end position, and the transfer process starts after the pickup process has been completed.

12. The process arrangement according to claim 11, wherein the setting process starts after the transfer process, and, in order to carry out the setting process, the transfer unit is initially moved into its setting position and remains stationary there, and the setting piston with the clip element held thereon is then moved from the retracted end position along the setting stroke into the extended end position in which the clip element is driven in by the setting piston, and, after the clip element has been driven into the component pilot hole, the setting piston is returned into its retracted end position, and the setting piston has a centering element by which a transverse movement of the clip element at the setting piston contact surface is prevented during the transfer process, and during the setting process in the course of the setting stroke, the centering element is brought out of centering engagement with the clip element, whereby a transverse movement of the clip element at the setting piston contact surface is allowed in order to realize a floating clip element support, by which a positional deviation between the component pilot hole and the clip element is compensated.

13. The process arrangement according to claim 11, wherein in order to compensate for component and manufacturing tolerances, the clip element has at its element tip a conical insertion bevel, and a process control having a force measurement sensor and a displacement sensor is provided, with which a force and displacement variation of the setting piston is detected and compared with corresponding set values, wherein the process control recognizes a fault when a significant deviation from the set values is determined, and the transfer unit is a program-controlled industrial robot, and the setting device is mounted on a distal end of a robot arm of the industrial robot, and before the setting process is carried out, a teach-in process is carried out, in which the industrial robot, without program control, by a programmer, approaches the pickup position and the setting position and the spatial coordinates of the industrial robot in the pickup position and in the setting position are stored in the program control, so that after completion of the teach-in process the industrial robot autonomously moves to the pickup and setting positions by the program control.

14. The process arrangement according to claim 11, wherein the clip element has an element head which is extended by an element shaft, and, in the assembled state, the element shaft projects into the component pilot hole and the element head is supported on the opening edge region of the component pilot hole, and the positioning aid shaft is inserted into the component pilot hole with a small hole clearance, and a ring collar is formed on the positioning aid shaft, wherein the ring collar is spaced apart from the positioning aid head in an axial direction by an axial offset which corresponds to a setting stroke travel, so that, for determining the spatial coordinates of the industrial robot in the setting position, the positioning aid is held with its positioning aid head on the setting piston and is centered by the centering tip and the centering hole, in suction contact, and the industrial robot positions the positioning aid without program control, by a programmer, with its shaft tip into the component pilot hole until the ring collar is in contact with the opening edge region of the component pilot hole, and the spatial coordinates thereby assumed by the industrial robot is stored as setting position coordinates in the program control.

15. The process arrangement according to claim 1, wherein in order to compensate for component and manufacturing tolerances, the clip element has at its element tip a conical insertion bevel, and a process control having a force measurement sensor and a displacement sensor is provided, with which a force and displacement variation of the setting piston is detected and compared with corresponding set values, wherein the process control recognizes a fault when a significant deviation from the set values is determined, and the transfer unit is a program-controlled industrial robot, and the setting device is mounted on a distal end of a robot arm of the industrial robot, and before the setting process is carried out, a teach-in process is carried out, in which the industrial robot, without program control, by a programmer, approaches the pickup position and the setting position and the spatial coordinates of the industrial robot in the pickup position and in the setting position are stored in the program control, so that after completion of the teach-in process the industrial robot autonomously moves to the pickup and setting positions by the program control.

16. A method for carrying out a setting process by a process arrangement according to claim 1.

17. The process arrangement according to claim 1, wherein in order to compensate for component and manufacturing tolerances, the clip element has at its element tip a conical insertion bevel, and a process control having a force measurement sensor and a displacement sensor is provided, with which a force and displacement variation of the setting piston is detected and compared with corresponding set values, wherein the process control recognizes a fault when a significant deviation from the set values is determined, and the transfer unit is a program-controlled industrial robot, and the setting device is mounted on a distal end of a robot arm of the industrial robot, and before the setting process is carried out, a teach-in process is carried out, in which the industrial robot, without program control, by a programmer, approaches the pickup position and the setting position and the spatial coordinates of the industrial robot in the pickup position and in the setting position are stored in the program control, so that after completion of the teach-in process the industrial robot autonomously moves to the pickup and setting positions by the program control.

18. The process arrangement according to claim 17, wherein the centering element is a centering sleeve which is elastically resiliently supported on the setting piston in the setting direction, and, during the transfer process and at the start of the setting process, the centering sleeve projects beyond the setting piston with an axial projection, and in the course of the setting stroke, the centering sleeve comes into contact with the opening edge region of the component pilot hole, while the stroke of the setting piston is further adjusted, using up the axial protrusion, until the extended setting piston end position is reached, and, in the pickup position, the clip element is deposited on a ground surface of the supply station, and the positioning aid has a positioning aid head and a positioning aid shaft, and the positioning aid extends over a component length which corresponds to the sum of the setting stroke and the clip element component length, so that for determining the spatial coordinates of the industrial robot in the pickup position the positioning aid is held with its positioning aid head on the setting piston and is centered by a centering tip and a centering hole, and the industrial robot places the positioning aid without program control by a programmer, with its shaft tip on a base surface of the supply station in the correct position, and the spatial coordinates thereby assumed by the industrial robot is stored in the program control as pickup position coordinates.

19. The process arrangement according to claim 1, wherein the clip element has an element head which is extended by an element shaft, and, in the assembled state, the element shaft projects into the component pilot hole and the element head is supported on the opening edge region of the component pilot hole, and the positioning aid shaft can be inserted into the component pilot hole with a small hole clearance, and a ring collar is formed on the positioning aid shaft, wherein the ring collar is spaced apart from the positioning aid head in an axial direction by an axial offset which corresponds to a setting stroke travel, so that, for determining the spatial coordinates of the industrial robot in the setting position, the positioning aid is held with its positioning aid head on the setting piston and is centered by the centering tip and the centering hole, in suction contact, and the industrial robot positions the positioning aid without program control, by a programmer, with its shaft tip into the component pilot hole until the ring collar is in contact with the opening edge region of the component pilot hole, and the spatial coordinates thereby assumed by the industrial robot can be stored as setting position coordinates in the program control.

\* \* \* \* \*